United States Patent [19] [11] 4,211,524

Jennrich [45] Jul. 8, 1980

[54] ROLLS FOR COMPACTING MILL

[75] Inventor: George J. Jennrich, Milwaukee, Wis.

[73] Assignee: Allis-Chalmers Corporation, Milwaukee, Wis.

[21] Appl. No.: 949,538

[22] Filed: Oct. 10, 1978

[51] Int. Cl.[2] ........ A23G 1/20

[52] U.S. Cl. ........ 425/296; 425/308

[58] Field of Search ........ 425/308, 296

[56] References Cited

U.S. PATENT DOCUMENTS 3,713,763 1/1973 Harris ........ 425/308

3,897,183 7/1975 Hofman ........ 425/308

*Primary Examiner*—Donald J. Arnold

*Assistant Examiner*—James R. Hall

*Attorney, Agent, or Firm*—James R. Custin; Arthur M. Streich

[57] ABSTRACT

Rolls 9, 10 for a compacting mill 5 by which finely divided agglomerative material 6 is compacted into a sheet 7 produce a pattern of slots 23 in the opposite surfaces of the sheet 7 whereby the sheet is encouraged to fracture into tablet-like bodies 8 of uniform size and shape. The slots 23 are defined by uniformly spaced ridges 21 on the rolls 9, 10, the ridges 21 on one roll 9 or 10 extending transversely to those on the other roll 10 or 9. Preferably the ridges 21 extend circumferentially on one roll 9 and axially on the other roll 10. A form for the ridges 21 is described that enables their easy and complete withdrawal from the slots 23 in the sheet 7 and encourages the sheet 7 to fracture on the medial plane of every slot 23.

3 Claims, 5 Drawing Figures

ROLLS FOR COMPACTING MILL

TECHNICAL FIELD OF THE INVENTION

This invention relates to compacting apparatus by which agglomeratable material can be formed into tablet-like or pellet-like bodies; and the invention is more particularly concerned with apparatus comprising a pair of compacting rolls between which relatively finely divided material is caused to pass and by which such material is compacted into a sheet that can be readily subdivided into pellets or tablets of substantially uniform size and shape.

BACKGROUND OF THE PRIOR ART

In many processes such as ore beneficiation and the manufacture of portland cement, powdery or finely divided material must be agglomerated into bodies of more or less uniform size and shape that are intended to be roasted in a kiln or subjected to some other treatment.

One type of apparatus heretofore used for the purpose was a compacting mill such as is disclosed in U.S. Pat. No. 3,396,952, wherein fine material was fed into the nip of a pair of opposed cylindrical rolls that rotated in opposite directions about parallel axes. Compacted by the rolls, the material emerged from between them in the form of a sheet that was passed more or less directly to a breaking device that broke the sheet into so-called flakes. Inasmuch as the sheet tended to break at random, the flakes thus obtained were irregular in both shape and size, and some of the fines were freed from the compacted mass. The material was therefore passed directly from the breaking device to a separating screen at which the fines and the undersized flakes were separated from the remainder of the compacted material. Usually the undersize material that fell through the screen was circulated back through the compacting mill to be recycled.

For many applications, especially where the agglomerated material was subjected to a heat treatment involving critical time and temperature relationships, the random sizing of the flakes that passed over the separating screen was a disadvantage. However, even where the lack of uniformity of useable flakes was not a serious disadvantage, fines and undersized flakes tended to be produced in undesirable quantities. Frequently as much as 50% of the material had to be recycled after screening, and of course such recycling caused a corresponding decrease in the rate of production of useable flakes.

Where bodies of substantially uniform size and shape were needed, it was usual to employ the slower, more expensive and more troublesome briquetting technique. Briquetting is accomplished by means of apparatus such as is disclosed, for example, in U.S. Pat. No. 3,713,763, wherein the material to be compacted is fed through the nip of a pair of rolls that are formed with mating concave pockets in their cylindrical surfaces. The formation of the individual pockets in such rolls is difficult, and the rolls must be in such angular relationship to one another, and must be so synchronized in their rotations, that at the nip of the rolls the pockets in each roll are always directly opposite mating pockets in the other roll.

Although balling pans and balling drums can be used for pelletizing certain materials, such devices usually require that moisture be added to the material for pelletization. For some purposes, therefore, pellets formed with balling equipment must be dried before they can be subjected to further processing, whereas the addition of moisture to material to be put through a compacting mill or a briquetting machine is often unnecessary. Furthermore, pelletizing apparatus merely effects agglomeration of the fines into small masses and does not subject them to compacting pressure. For some applications, the greater density that results from compacting, or some other physical property that compacting produces, may be necessary or desirable.

Thus there has been a long-standing need, heretofore unsatisfied, for compacting apparatus by which agglomeratable fine material can be converted into pellet-like or tablet-like bodies that are substantially uniform in size and shape; and it is the general object of the present invention to provide simple, inexpensive and efficient apparatus which satisfies that need.

Another object of this invention is to provide improvements in a basically conventional compacting mill whereby the mill is enabled to produce a compacted sheet which tends to break along predetermined planes that extend transversely to the thickness of the sheet and are in mutually perpendicular relation to one another, so that the bodies formed by breakage of the sheet are substantially uniform in size and shape.

A further object of the invention is to provide apparatus of the character just described by which a compacted sheet is produced that can be broken into substantially uniform tablet-like or pellet-like bodies with minimal production of fines as a result of the breakage, so that relatively little recycling need take place in the operation of apparatus embodying the invention.

It is a more specific object of this invention to provide improved compacting rolls for an otherwise conventional compacting mill, capable of being installed in existing compacting mills to modify them for achievement of the above-stated objectives, which compacting rolls can be readily made by generally conventional machining processes.

It is also a specific object of this invention to provide compacting apparatus that has lower cost, higher production speed and greater production efficiency than briquetting apparatus, requires no maintenance of a particular angular relationship between its rolls, and nevertheless produces tablet-like bodies that are nearly as uniform in size and shape as briquettes.

SUMMARY OF THE INVENTION

In general, the objects of the invention are attained with a compacting mill having a pair of opposed, substantially cylindrical rolls that are driven for rotation in opposite directions on parallel axes, and means for feeding fine material into the nip of the rolls to be compactingly agglomerated by the rolls and to emerge from between them as a sheet, said apparatus being characterized by: each of said rolls having radially outwardly projecting narrow ridges thereon that are spaced apart by substantially uniform distances to define wider grooves betwen the ridges, the ridges on one roll extending thereon in a direction transverse to the direction in which the ridges on the other roll extend; and each of said ridges having a depth in the direction radial to the roll that is substantially greater than its width, having a root portion that joins the body of the roll at opposite concave fillets of substantially large radius so that the bottom surface of each of said grooves merges into its side surfaces around such fillets, and having its radially outermost portion substantially tapered in cross section so that each ridge defines a slot in a sheet compacted by the rolls, which slot opens to one surface of the sheet, has its length transverse to the lengths of slots opening to the opposite surface of the sheet, and encourages the sheet to break substantially along a medial plane extending along the slot.

In a preferred embodiment of the invention the ridges on one of the rolls extend around it circumferentially while the ridges on the other roll extend along it axially, and the ridges on the one roll are spaced apart by the same distances as the ridges on the other roll.

DETAILED DESCRIPTION OF THE INVENTION

Figure 1:
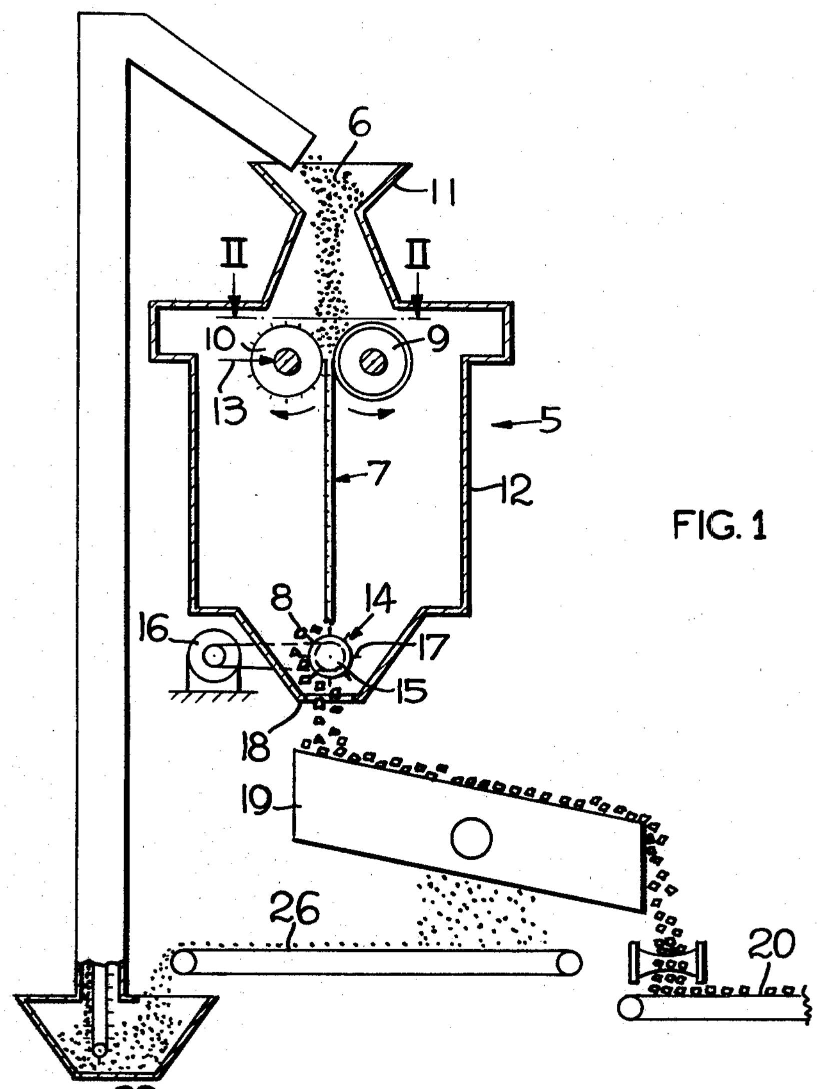
FIG. 1 is a more or less diagrammatic view in vertical section of a compacting mill in which rolls are incorporated that embody the principles of this invention.

Referring now to the accompanying drawings, the numeral 5 designates a compacting mill into which powdered or finely divided material 6 is fed and by which such material is compacted into a sheet 7 that is ultimately broken into tablet-like or pellet-like bodies 8 of substantially uniform size and shape. Except for its rolls 9, 10, the compacting mill is generally conventional and is of the type disclosed in U.S. Pat. No. 3,396,952, to Jennrich et al, to which reference may be made for further details.

Figure 2:
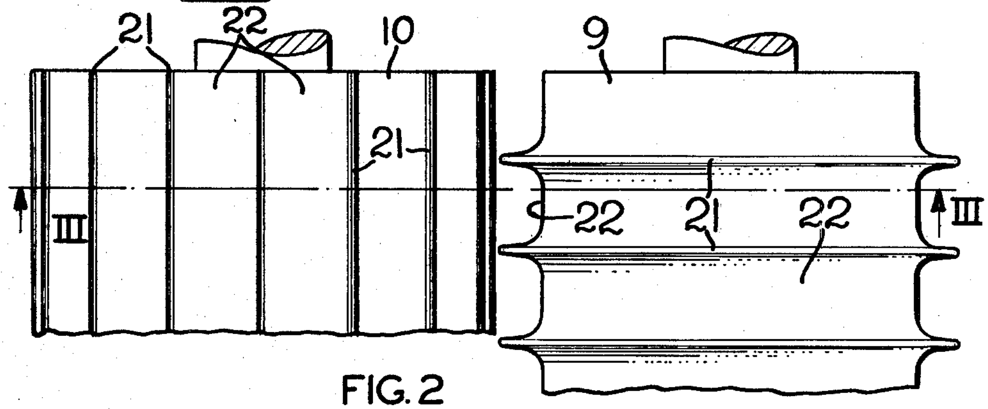
FIG. 2 is a view taken on the plane of the line II—II in FIG. 1 showing compacting mill rolls that embody the invention, in operative relationship to one another.
Figure 3:
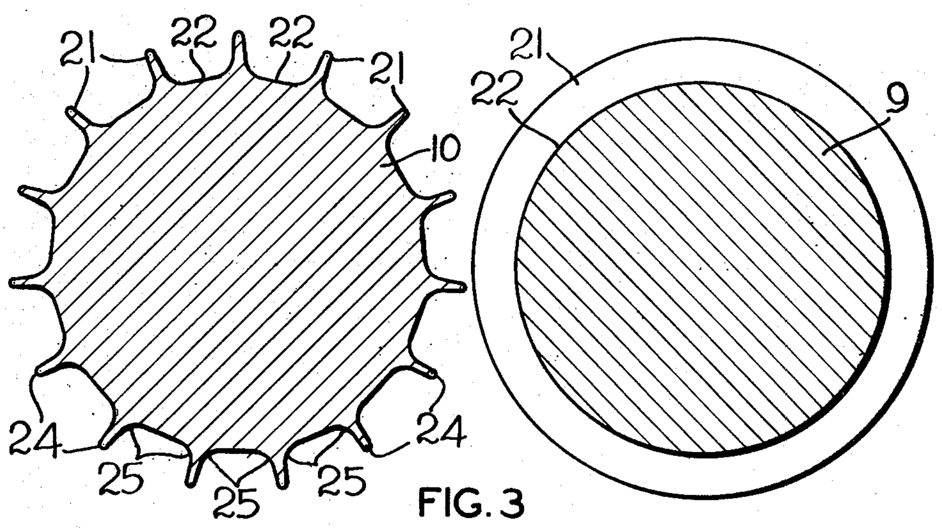
FIG. 3 is a view of the longitudinally ridged roll in cross-section, taken on the plane of the line III—III in FIG. 2.
Figure 4:
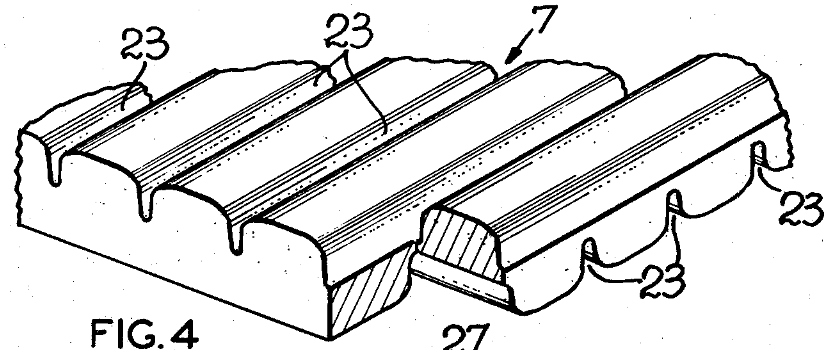
FIG. 4 is a perspective view of a portion of a compacted sheet made with the rolls of this invention.
Figure 5:
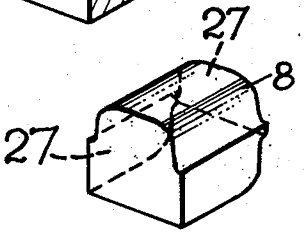
FIG. 5 is a perspective view of one of the tablet-like bodies that is formed by breaking the sheet shown in FIG. 4.

In general, the compacting mill 5 comprises a hopper 11 which is located above the substantially cylindrical rolls 9, 10 and into which the fines 6 are fed, and means supporting the rolls in laterally opposing relation to one another with their axes parallel. As may be seen from the Jennrich et al patent, the rolls are constrained to rotate about their axes in opposite directions such that their upper portions move towards one another. Furthermore, at least one of the rolls is bodily movable through limited distances in directions toward and from the other and is maintained under a biasing force, denoted by the arrow 13, that urges it towards the other roll to apply compacting pressure to the material passing between the rolls. The means mounting the rolls for rotation and for bodily relative movement, the drive means for imparting rotation to the rolls, and the biasing means for urging the rolls relatively towards one another are not here shown because they are illustrated and explained in the Jennrich et al patent, particularly in FIG. 2 thereof.

The rolls 9, 10 rotate within a housing 12 that can comprise a downward continuation of the hopper 11. Located inside the housing 12 and at some distance below the compacting rolls is a generally conventional breaking mechanism 14, illustrated as a drum or cylinder 15 that is rotatably driven by means of a motor 16 and has radially projecting teeth or claws 17 which engage the sheet 7 and break it up into the bodies 8. The bottom portion 18 of the housing 12, in which the breaking mechanism is located, has a funnel-like configuration to collect the bodies 8 and any fines that may result from the breaking operation and guide them onto a vibrating screen 19 beneath the housing. Any undersize bodies and fines that may fall through the screen 19 are recirculated (as by conventional conveyor means 26) back to the top of the hopper 11, while the carryover bodies that move along on top of the screen are passed to a conveyor 20 by which they are transferred to storage or carried into a kiln or the like (not shown) for further treatment.

Turning now to a more detailed consideration of the compacting rolls 9, 10, they are preferably equal in length and in body diameter and rotate at like speeds, but they differ from one another with respect to the arrangement of certain ridges 21 that both of them possess as characterizing features of the present invention. These ridges 21 project radially outwardly from the roll in each case, and they are spaced from one another to define grooves 22, but the ridges on one roll extend in a direction that is transverse to the direction in which the ridges on the other roll extend. Thus the ridges could take the form of helices, with the ridges on one roll spiralling in the direction opposite to the ridges on the other; but preferably, for simplicity, the ridges on one roll (the roll 9 as shown) extend circumferentially around that roll while the ridges on the other roll 10 extend axially along it.

The function of the ridges 21 is to produce elongated slots 23 in the sheet 7 that emerges from between the rolls. These slots open to opposite surfaces of the sheet, with the slots that open to one surface of the sheet being lengthwise transverse to the slots that open to its opposite face. Thus the slots formed by the circumferentially ridged roll 9 extend all along the length of the sheet, while the slots formed by the axially ridged roll 10 extend entirely across the sheet. By reason of the locally reduced thickness of the sheet due to the presence of each slot, the sheet tends to break along the slots, rather than at random, and it is thus converted by the breaking mechanism 14 into uniform tablet-like bodies 8. If all of the ridges on the two rolls 9, 10 are spaced apart by like distances, as is preferred, then the slots 23 opening to the two surfaces of the sheet together define a pattern of squares, and correspondingly the bodies 8 that are produced from the sheet are substantially in the form of cubes or small rectangular blocks.

Having in mind that the purpose of the slots 23 in the sheet 7 is to define relatively narrow zones of weakness that encourage the sheet to fracture along planes normal to its surfaces, the slots are relatively narrow in relation to their depth, and they are narrowest at their bottoms to promote development of stress concentrations as the sheet is engaged by the breaker claws 17. To form the slots with the required configuration, every ridge 21 on each roll has a height, as measured radially to its roll, that is substantially greater than its width or thickness. Furthermore, at least the radially outermost portion of each ridge 21 has substantial outward taper so that its tip portion 24 is considerably narrower than portions inwardly thereof, and preferably each ridge tapers all along its radial dimension so that it can be readily drawn out of the slot that it forms. To further ensure clean and easy separation of each roll from the sheet, each ridge 21 joins the body of its roll at opposite concave fillet surfaces 25 of substantial radius, so that the grooves 22 between ridges have flat or slightly concave bottoms that merge into the sides of the ridges around curved surfaces.

It will be evident that each of the slots 23 will cause the sheet 7 to break approximately on the medial plane of that slot, that is, on its lengthwise extending plane of symmetry. In this way the slots 23 ensure breakage of the sheet into bodies 8 of uniform size and shape. In addition, the slots 23 also serve to reduce the amount of fines resulting from breakage of the sheet, because fines are dislodged almost exclusively from surfaces formed by breakage, and the surfaces 27 on each body 8 that are formed by breakage represent a substantially smaller percentage of the total surface area of the body than the corresponding breakage surfaces on a heretofore conventional irregular flake.

It will be apparent that the ridges 21 and the grooves 22 can be formed on compacting rolls embodying the principles of this invention by simple and conventional processes which are well known to skilled machinists and which therefore need not be described. It will also be apparent that rolls of this invention can be installed in a conventional compacting mill as direct replacements for heretofore conventional plain cylindrical compacting rolls, without any need for modification or alteration of the compacting mill or its principles of operation.

The embodiments of the invention in which an exclusive property or privilege is claimed are defined as follows:

1. Apparatus by which agglomerative material (6) is compacted into a sheet (7) that can be broken in tablet-like bodies (8) of substantially uniform size and shape, said apparatus being of the type comprising a pair of opposing substantially cylindrical rolls (9, 10) that have parallel axes, and means (11) for feeding agglomerative material into the nip of said rolls while said rolls rotate in opposite directions and while one of said rolls is urged bodily towards the other with a force that causes the material to be compacted as it passes between the rolls (9, 10), said apparatus comprising:

A. each of said rolls (9, 10) having radially outwardly projecting ridges (21) thereon that are spaced apart by substantially uniform distances to define grooves (22) between the ridges (21);

B. all of the ridges (21) on a first one of said pair of rolls (9) being both parallel to each other and extending thereon solely in a circumferential direction around said first roll (9), and all of the ridges (21) on the other of said pair of rolls (10) being parallel to each other and extending thereon solely in a direction transverse to the direction in which the ridges (21) on the said first one of said pair of rolls (9) extend; and C. each of said ridges (21)

(a) having a depth in the direction radial to the roll that is substantially greater than its width, (b) having a root portion that joins the body of the roll at opposite concave fillets (25) of substantially large radius so that the bottom surface of each of said grooves (22) merges into its side surfaces around such fillets, and (c) having it radially outermost portion (24) substantially tapered in cross-section, so that each ridge (21) defines a slot (23) in a sheet (7) compacted by the rolls, which slot (23) opens to one surface of the sheet, extends transversely to slots (23) opening to the opposite surface of the sheet, and encourages the sheet to break substantially along the slot.

2. The apparatus of claim 1 wherein the grooves (22) between adjacent ridges (21) are substantially wider than the ridges.

3. The apparatus of claim 2 wherein said grooves (22) have concavely rounded bottoms.

* * * * *